United States Patent
Lee et al.

(10) Patent No.: US 10,755,200 B2
(45) Date of Patent: *Aug. 25, 2020

(54) AUTOMATED CONTROL OF CIRCUMFERENTIAL VARIABILITY OF BLAST FURNACE

(71) Applicant: International Business Machines Corporation, Armonk, NY (US)

(72) Inventors: Young Min Lee, Old Westbury, NY (US); Kyong Min Yeo, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 149 days.

This patent is subject to a terminal disclaimer.

(21) Appl. No.: 15/712,255

(22) Filed: Sep. 22, 2017

(65) Prior Publication Data
US 2019/0095812 A1    Mar. 28, 2019

(51) Int. Cl.
*G06N 20/00*    (2019.01)
*C21B 7/00*    (2006.01)
(Continued)

(52) U.S. Cl.
CPC ............. *G06N 20/00* (2019.01); *C21B 5/006* (2013.01); *C21B 7/00* (2013.01); *C21B 7/24* (2013.01);
(Continued)

(58) Field of Classification Search
CPC ...... C21B 7/00; F27B 1/26; F27D 2019/0003; G06N 20/00; G01B 21/085; G01N 25/18
See application file for complete search history.

(56) References Cited

U.S. PATENT DOCUMENTS

| 5,205,979 A | 4/1993 | Matsuyama et al. |
| 6,523,998 B1 | 2/2003 | Danley et al. |
(Continued)

FOREIGN PATENT DOCUMENTS

CN    101408314 B    4/2009

OTHER PUBLICATIONS

"H. Unbehauen and K. Dieknnann", "Application of MIMO-Identification to a Blast Furnace", 1982, Ruhr-University Bochum (Year: 1982).*

(Continued)

*Primary Examiner* — Santosh R Poudel
(74) *Attorney, Agent, or Firm* — Scully, Scott, Murphy & Presser, P.C.; Daniel P. Morris

(57) ABSTRACT

Controlling circumferential variability in a blast furnace may include generating a predictive model that sets up a relationship between a standard deviation of a selected state variable, state variables and one or more control variables in blast furnace operation for predicting the standard deviation. A number of circumferential sections of the blast furnace is defined, and the predictive model associated with the selected state variable for each of the circumferential sections is trained based on process data of the blast furnace. A plurality trained predictive models is generated associated with different circumferential sections and different selected state variables. One or more future control variable set points that minimize a sum of the plurality of predictive models, is determined. One or more future control variable set points is transmitted to a control system to control the blast furnace operation.

15 Claims, 6 Drawing Sheets

(51) Int. Cl.
G05B 19/4155 (2006.01)
G06N 5/02 (2006.01)
C21B 5/00 (2006.01)
F27D 19/00 (2006.01)
C21B 7/24 (2006.01)
F27B 1/26 (2006.01)

(52) U.S. Cl.
CPC ............... *F27B 1/26* (2013.01); *F27D 19/00* (2013.01); *G05B 19/4155* (2013.01); *G06N 5/022* (2013.01); *C21B 2300/04* (2013.01); *F27D 2019/0003* (2013.01); *F27D 2019/0006* (2013.01); *F27D 2019/0034* (2013.01); *G05B 2219/42058* (2013.01)

(56) References Cited

U.S. PATENT DOCUMENTS

| | | | |
|---|---|---|---|
| 6,937,966 B1* | 8/2005 | Hellerstein | G06Q 10/06 |
| | | | 703/2 |
| 6,969,416 B2 | 11/2005 | Saucedo | |
| 8,219,247 B2 | 7/2012 | Esmaili et al. | |
| 2007/0100502 A1* | 5/2007 | Rennie, Jr. | F22B 35/18 |
| | | | 700/266 |
| 2007/0168057 A1* | 7/2007 | Blevins | G05B 13/022 |
| | | | 700/53 |
| 2011/0311930 A1 | 12/2011 | El Ghaoui et al. | |
| 2012/0148373 A1* | 6/2012 | Howell | C21B 7/20 |
| | | | 414/199 |
| 2013/0302738 A1* | 11/2013 | Rennie | F23N 1/022 |
| | | | 431/12 |
| 2015/0261200 A1* | 9/2015 | Blevins | G05B 17/02 |
| | | | 700/21 |
| 2017/0283891 A1* | 10/2017 | Zhao | C21B 5/00 |
| 2018/0113482 A1* | 4/2018 | Vitullo | H04L 12/2823 |

OTHER PUBLICATIONS

"Simple way to understand machine learning vs deep learning" Jul. 18, 2017, Zendesk, "https://www.zendesk.conn/blog/machine-learning-and-deep-learning" (Year: 2017).*

"Understanding LSTM Networks", Aug. 27, 2015, Colah's blog (Year: 2015).*

Yongliang Yang et al. "Development of Blast Furnace Burden Distribution Process Modeling and Control", Jul. 7, 2017, ISIJ, Vo. 57 , pp. 1350-1363 (Year: 2017).*

List of IBM Patents or Patent Applications Treated as Related, dated Nov. 14, 2017, 2 pages.

* cited by examiner

AUTOMATED CONTROL OF CIRCUMFERENTIAL VARIABILITY OF BLAST FURNACE

FIELD

The present application relates to manufacturing, blast furnace, and controlling circumferential variability in blast furnace operations.

BACKGROUND

Blast furnace operation in steel manufacturing process is a complex, continuous operation that involves multiple chemical reactions and phase transitions of materials. Maintaining the operating temperature profile and pressure profile inside of the blast furnace to the desired level can improve productivity, stabilize the operation and facilities, reduce quality defect, and reduce production cost.

BRIEF SUMMARY

A system and method of controlling circumferential variability in a blast furnace may be provided. The method, in one aspect, may include generating a predictive model that sets up a relationship between a standard deviation of a selected state variable, state variables and one or more control variables in blast furnace operation for predicting the standard deviation. The method may also include defining a number of circumferential sections of the blast furnace. The method may further include receiving process data associated with the blast furnace operation. The method may also include training the predictive model associated with the selected state variable for each of the circumferential sections based on the process data, wherein a plurality trained predictive models is generated associated with different circumferential sections and different selected state variables, the different selected state variables comprising temperature and pressure. The method may further include determining one or more future control variable set points that minimize a sum of the plurality of predictive models that are trained. The method may also include transmitting the one or more future control variable set points to a control system to control the blast furnace operation.

A system of controlling circumferential variability in a blast furnace, in one aspect, may include at least one hardware processor operable to generate a predictive model that sets up a relationship between a standard deviation of a selected state variable, state variables and one or more control variables in blast furnace operation for predicting the standard deviation. The at least one hardware processor may be further operable to define a number of circumferential sections of the blast furnace. A storage device storing process data associated with the blast furnace operation may be coupled to the at least one hardware processor. The at least one hardware processor may be further operable to receive the process data associated with the blast furnace operation, train the predictive model associated with the selected state variable for each of the circumferential sections based on the process data, wherein a plurality trained predictive models is generated associated with different circumferential sections and different selected state variables, the different selected state variables comprising temperature and pressure. The at least one hardware processor may be further operable to determine one or more future control variable set points that minimize a sum of the plurality of predictive models that are trained. The at least one hardware processor coupled to a control system, and operable to transmit the one or more future control variable set points to control the blast furnace operation.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and techniques are disclosed that develop a predictive model (e.g., a Deep Learning (DL)-based predictive model) and a model predicted control (MPC) method for controlling circumferential variability of a blast furnace. Circumferential variability refers to variability in operational states (e.g., temperature or pressure) of circumferential sections, for example, of a blast furnace in operation. It may be desirable to keep or maintain uniform or balanced operational state or states throughout a circumferential section. A blast furnace has sensors (e.g., temperature, pressure sensors) mounted on the wall of the blast furnace, and the real-time sensor data measurements received from the mounted sensors (e.g., temperature and pressure data) may be used to develop a predictive model and the MPC method. In one embodiment, the predictive model may be machine learning (ML) based or deep learning (DL) based. In one embodiment, an MPC method determines settings of control variables (e.g., determined to be optimal), which may be sent to a process control system, which controls the manufacturing operation of the blast furnace. In one aspect, the MPC method determines one or more control variables that optimize the circumferential variability of temperature and/or pressure (or another selected variable for balancing) in a future state or states of the blast furnace operation.

Figure 1:
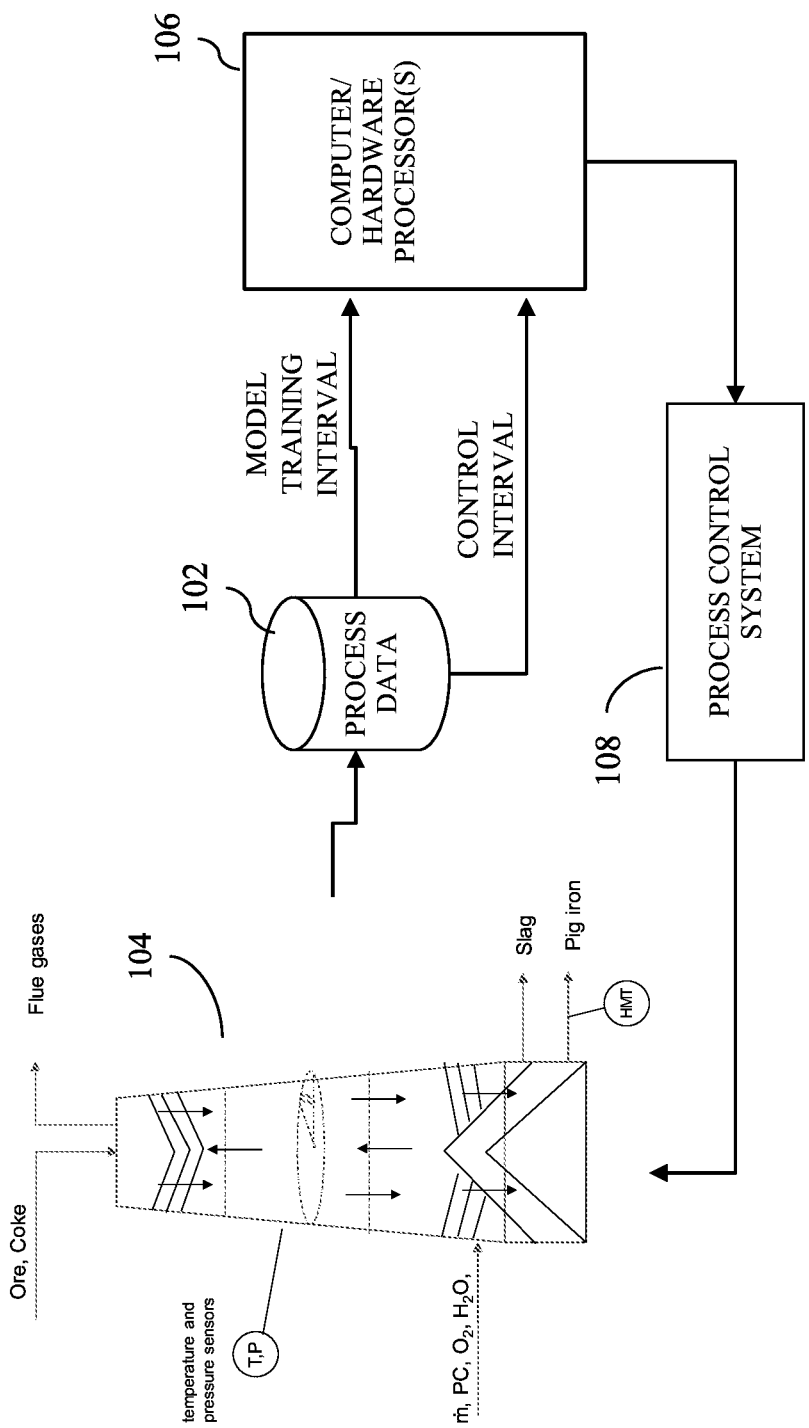
FIG. 1 is a diagram illustrating components of a modeling system in one embodiment.

FIG. 1 is a diagram illustrating components of a modeling system in one embodiment. A storage device 102 may store a database of process data received from the sensors mounted on a blast furnace 104. For instance, sensor data is sent from the sensors to a computer processor or the like, that may store the data in the storage device 102. A computer processor or hardware processor 106 coupled to the storage device 102 receives the process data, generates (e.g., defines and trains) a predictive model and runs an MPC method that determines one or more control variable values for controlling the future state of the blast furnace. The one or more control variable values determined by running the MPC method may be sent to a control system 108 coupled to the blast furnace 104. The control system 108 may control or adjust the operational parameters of the blast furnace according to the control variable values determined by the MPC method. The control system 108 may include one or more actuators, coupled to the blast furnace, which control the physical operating parameters of the blast furnace. In one aspect, a computer or hardware processor that stores the process data 102 received from the sensors need not be the same computer processor that generates the predictive model or runs the MPC method. In one aspect, a computer processor that may generate a predictive model may be the same computer processor that runs the MPC method. In another aspect, a computer processor that may generate a predictive model may be a different computer processor from the one that runs the MPC method.

Figure 2:
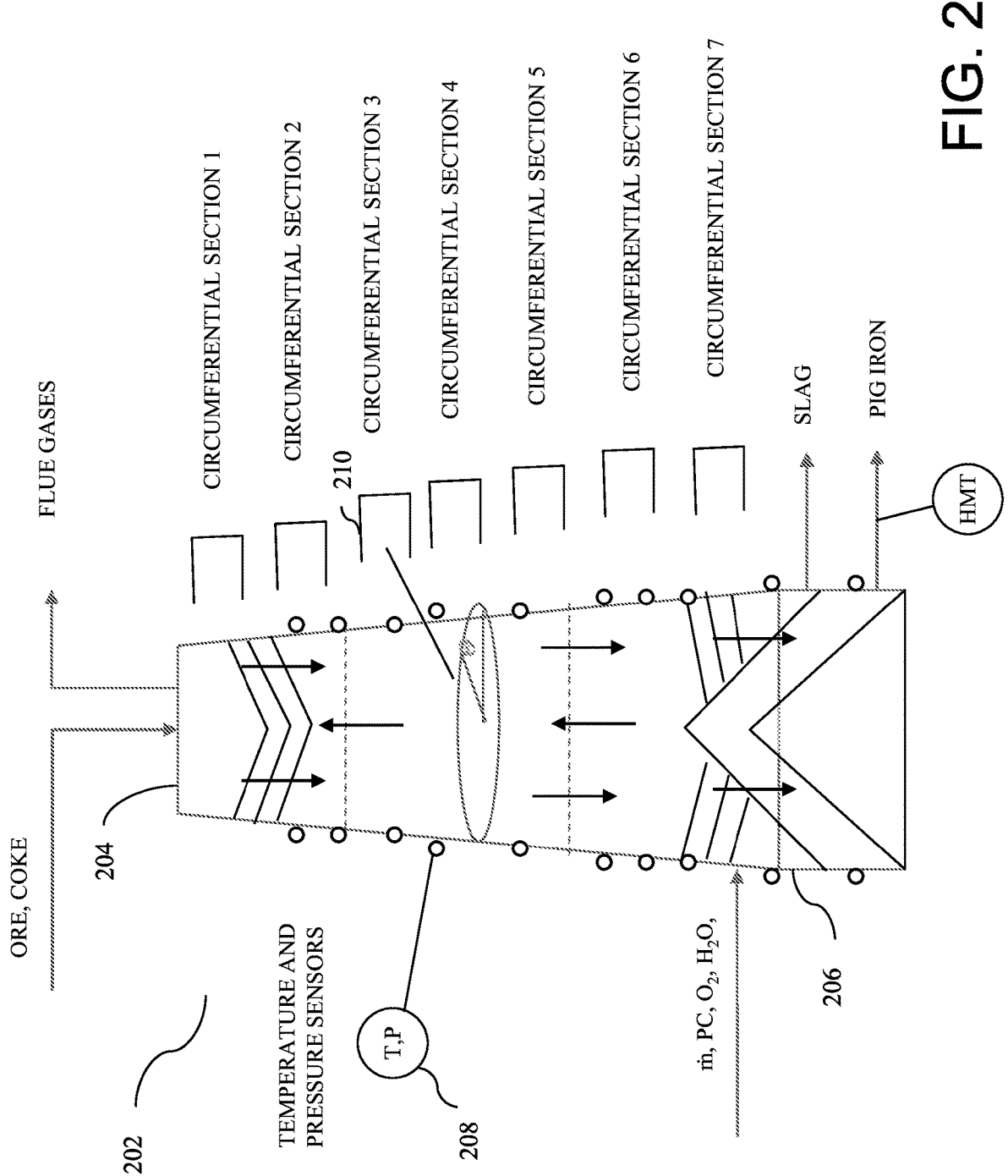
FIG. 2 is a diagram illustrating a blast furnace in one embodiment.

FIG. 2 is a diagram illustrating a blast furnace in one embodiment, for example, shown in FIG. 1 at 104. A blast furnace 202 is a stack (e.g., a cylindrical stack) in which raw material such as iron ore and coke are deposited into the top 204 and preheated air with moisture and enriched oxygen and pulverized coal are blown into the bottom 206. The blast furnace is also equipped with sensors such as the temperature sensors and the pressure sensors that are mounted around the circumference and along the height of the blast furnace that measure various data, for example, the temperature and the pressure, of the blast furnace in operation.

A blast furnace in steel manufacturing process involves a complex, non-linear and continuous operation that includes multiple chemical reactions, phase transitions, and multiple phase interactions of materials. The blast furnace is operated in extreme conditions (e.g., temperature of approximately 2000 degrees Celsius, and atmospheric pressure of approximately 4 standard atmosphere (atm)). There may be hundreds of process variables (e.g., temperature, pressure, raw material charge and exit) that are monitored and stored, for example, by the sensors. Temperature sensors and pressure sensors may be coupled to the surface of the blast furnace that measure the temperature and pressure of the blast furnace at different locations. At the raw material charge and the exit of the tap hole, sensors may be coupled that measure the input and output rates. The hot metal temperature (HMT) and content of Silicon (Si), Phosphate (P), Sulfur (S) and other compounds of the pig iron that is produced (output from the bottom of the blast furnace) may be measured at different times, for example, at intervals of time.

The operation of the blast furnace consumes a large amount of energy and emits a large amount of carbon dioxide ($CO_2$). A control objective of the blast furnace iron-making process is to keep the operation close to the optimal level, i.e., desired pig iron quality, low energy consumption and high production. A goal, for example, is to achieve a stable operation that achieves a desired blast furnace state and high quality pig iron, at low energy cost. The desired blast furnace state, for instance, includes balanced profiles of pressure and temperature, material (e.g., ore and coke) descending speed, gas permeability inside blast furnace, hot metal temperature, and Silicon (Si)/Phosphate (P)/Sulfate (S) content of pig iron.

One or more predictive models and an MPC method in one embodiment determine control variable values that control one or more selected state variables for balancing (e.g., the pressure and temperature), in circumferential sections of a blast furnace, for example, to be able to maintain balanced profiles of those selected state variables (e.g., pressure and temperature). For instance, the predictive model aims to maintain uniform or balanced profiles of pressure and temperature in each of the circumferential sections.

Figure 3:
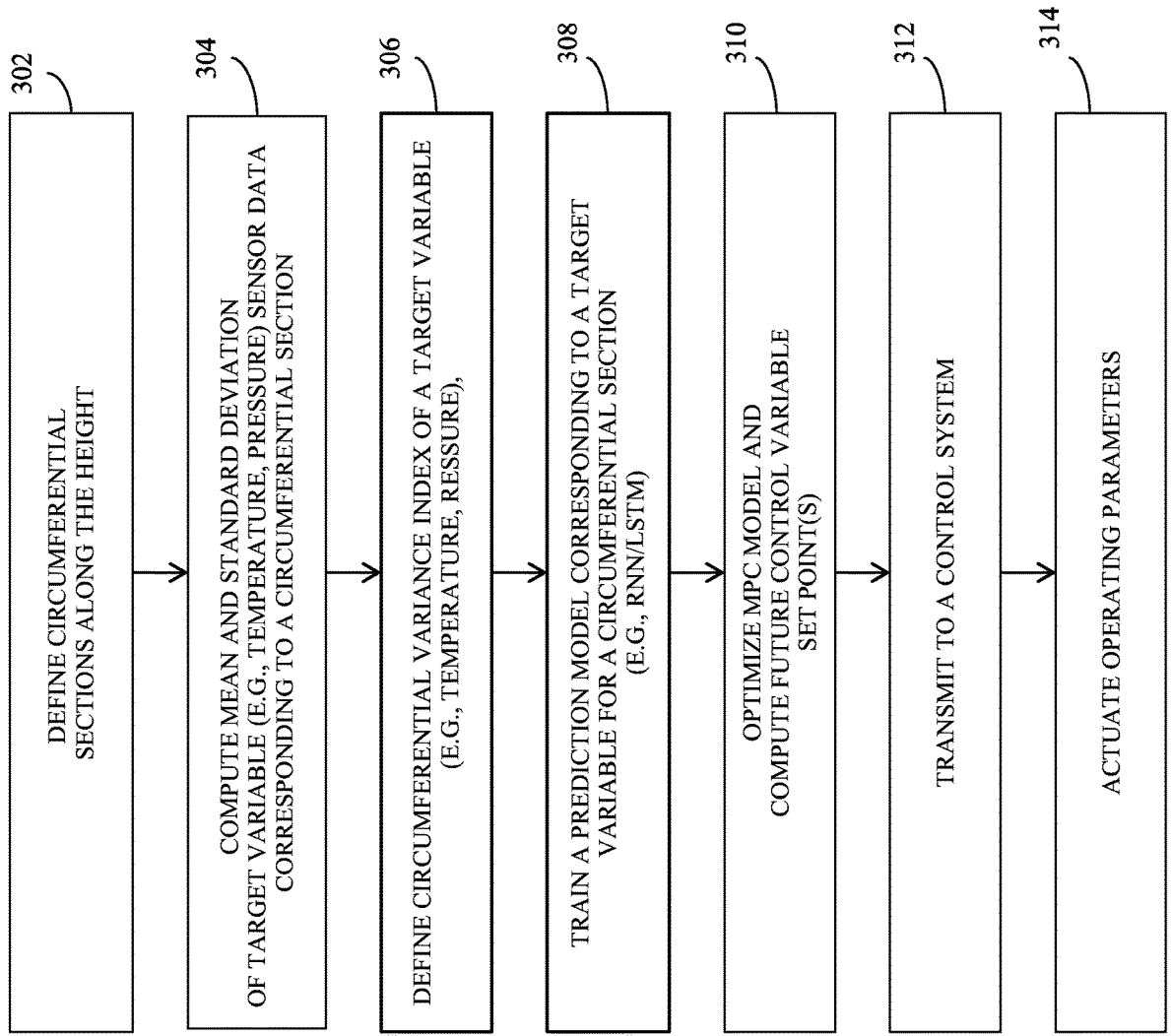
FIG. 3 is a diagram illustrating a method of generating a predictive model in one embodiment.

FIG. 3 is a diagram illustrating a method of predicting one or more control variables to control balanced profiles of one or more selected state variables in blast furnace operation, for example, balanced profiles of pressure and temperature. The description herein describes balancing profiles of temperature and pressure data. The methodology of the present disclosure, however, may be applicable to balancing other state variable data profiles in a manufacturing process. The method may be performed by one or more computer or hardware processors, for example, shown at 106 in FIG. 1.

At 302, a number of circumferential sections are defined along the height of a blast furnace. For instance, FIG. 2 at 210 shows an example of a circumferential section, for example, a cross sectional area of the blast furnace. The number is configurable and may be determined based on processing conditions such as the chemical reactions occurring in the blast furnace and sensor positions of the blast furnace. For example, there may be 3 section, or 10 sections, or another number of section. The sections may be non-overlapping, and may be contiguous section (e.g., without any gaps between the sections). Each of the circumferential sections includes sensors (e.g., temperature sensors and pressure sensors) along the wall of the blast furnace which measure responsive condition (e.g., the temperature and pressure) of the corresponding section (around the circumference of the section). A section may include a number of layers of sensor mounted around the wall of the blast furnace in that section. Thus, for example, each section includes temperature and pressure measurement data (or sensor data) corresponding to that section. In one embodiment, one or more predictive models that are generated and an MPC method that optimizes the predictive models predict one or more control variable values that control the temperature and pressure (or another selected state variable) of a section to be balanced or made uniform throughout that section.

At 304, for each of the sections, the mean and standard deviation of the selected variable(s) are determined. For instance, the mean and standard deviation of the temperature sensor data and the mean and standard deviation of pressure sensor data is determined based on the temperature and pressure measurement data (or sensor data) of that section.

At 306, a circumferential variability index of a selected variable for balancing is defined as the standard deviation of the selected variable, which is defined as a function of the past standard deviation values of the selected variable (e.g., temperature or pressure), the past values of state variables, the past values of one or more control variables and the future values of the one or more control variables. For example, a predictive model of circumferential variability is defined in one embodiment as:

$$\sigma_{t+1} = f(\sigma_t^-, X_t^-, U_t^-, U_{t+1}^+) \nabla S \qquad \text{Equation (1)}$$

where
target variable is represented by: $\sigma_t^- = \{\sigma_t, \sigma_{t-1}, \ldots, \sigma_{t-n}\}$,
state variables are represented by: $X_t^- = \{x_t, x_{t-1}, \ldots, x_{t-n}\}$,
where x represents a vector of state variables, n represents number of time steps (e.g., t-n represents past time that is past n time steps or units from the time t),
control variable(s) (past) is/are represented by: $U_t^- = \{u_t, u_{t-1}, \ldots, u_{t-n}\}$, where u represents one or more control variables, control variable(s) (future) is/are represented by: $U_{t+1}^+ = \{u_{t+1}, u_{t+2}, \ldots, u_{t+M}\}$, where u represents the one or more control variables, M represents time steps or units,
t represents a point in time (e.g., the current time),
S represents circumferential of sections, $$\sigma = \sqrt{\frac{1}{N}\sum_{i=1}^{N}(z_i - \mu)^2},$$

a standard deviation of a selected variable for balancing (e.g., temperature, or pressure in a circumferential section),
N represents the number of sensor or measurement data in a section,
σ represents a standard deviation of a selected variable for balancing (e.g., temperature, or pressure),
z represents the selected variable for balancing (e.g., temperature, or pressure) in the section.

Examples of state variables, x, include temperature, pressure and material composition. Examples of control variables may include charge or dumping rate of input material, for example, iron ore and coke, flow rate of blast air, moisture content of blast air, oxygen enrichment amount of blast air, and flow rate of pulverized coal. Which control variable to predict is configurable.

For instance, circumferential variability index of temperature in a section is defined as the standard deviation of temperature data corresponding to that section, which is defined as a function of the past values of the standard deviations of temperature in that section, the past values of state variables in that section, the past values of one or more control variables and the future values of the one or more control variables in that section. A circumferential variability index of pressure in a section is defined as the standard deviation of pressure data corresponding to that section, which is defined as a function of the past standard deviations of pressure in that section, the past values of state variables in that section, the past values of one or more control variables in that section and the future values of the one or more control variables in that section.

In one embodiment, a circumferential variability index is determined for each selected variable for balancing (e.g., for temperature and pressure) for each circumferential section. So for example, if there are two circumferential sections, and the selected variables for balancing are temperature and pressure, four circumferential variability indices (functions) shown in Equation (1) are modeled.

At 308, a prediction model (also referred to as a predictive model) corresponding to a target variable (σ) for a section is trained. In one embodiment, a prediction model is trained for each target variable in each of the circumferential sections. Training a prediction model includes learning the causal relationship between state variables, control variables and circumferential variability index (of a selected variable, e.g., temperature or pressure) of each circumferential section using a machine learning algorithm, for example, a deep learning model or algorithm. In one aspect, deep learning model architecture is set up based on the prediction models that define the circumferential variability indices. The learning model or training uses historical process data (e.g., FIG. 1, 102). In learning, the future values of the one or more control variables (which would not be available at current time) are set to the last known values.

For instance, considering temperature and pressure as the selected state variables for balancing, a prediction model for temperature is trained and a prediction model for pressure is trained, for each of a circumferential section, based on the data corresponding to that section. Training or learning of the causal relationship generates parameters (coefficients or weights) of a respective predictive model (Equation 1).

At 310, an MPC model is optimized to compute or determine future control variable set point or points (value(s) of control variable(s) to set so that target variable profile can be balanced). For instance, an MPC model is generated and executed. The MPC model computes the optimal control variable set point or points of the future time that minimize the sum of circumferential variability indices. An MPC model in one embodiment is shown in Equation (2).

$$\min_{U_{t+1}^+} \sum_{j=1}^{M}\left(\sum_{k=1}^{S}\beta_{jk}\sigma_{jk}\right) + \gamma_j\|u_{t+j} - u_{t+j-1}\|_2^2 \qquad \text{Equation (2)}$$

where
j is time step of prediction model,
M is forecasting horizon,
k is circumferential section,
S is total number of sections multiplied by the number of target variables (e.g., temperature and pressure),
$\beta_{jk}$ is weight for circumferential section k in time step j (e.g., weight may be higher for more preferred circumferential section and time step for balancing),
$\gamma_j$ is a coefficient for regularization for time step j. The regularization term prevents large fluctuations in control variable set points between time steps.

The above optimization computes $U_{t+1}^+$, up to t+M time steps, which minimize the function of Equation (2). Here $U_{t+1}^+$, is a 2-dimensional vector of control variables by time steps.

At 312, the future control variable set point or points determined based on optimizing the MPC model is transmitted to a control system. At 314, the control system may automatically actuate operating parameters of the blast furnace based on the future control variable set point or points.

In one aspect, a circumferential variability of temperature and pressure of a blast furnace is defined as the sum of standard deviation of temperature and pressure in each circumferential section along the wall (e.g., data measure by sensors mounted on the wall of the blast furnace). Control variable set points of a future time may be determined by minimizing the sum of the circumferential variability of temperature and pressure of a blast furnace. A methodology in one embodiment defines the circumferential variability index of temperature and pressure of a blast furnace as standard deviations of the temperature and pressure respectively, learns the causal relationship between state variables, control variables, and circumferential variability index of temperature and pressure, for example, using a machine learning and/or a deep learning algorithm or model, and solves an MPC optimization problem to compute a control set point or points. In one embodiment, circumferential sections of temperature and pressure along the wall of the blast furnace are defined based on processing conditions (e.g., chemical reactions, sensor positions). The circumferential variability index of temperature of a blast furnace may be defined as a standard deviation of temperature in the corresponding circumferential section. The circumferential variability index of pressure of a blast furnace may be defined as a standard deviation of pressure in the corresponding circumferential section. The optimal control variable set points of the future time may be computed by minimizing the sum of circumferential variability indices of temperature and pressure in all sections. The optimal set point or points may be sent to a process control system to automatically and/or autonomously control the manufacturing operation to maintain the circumferential variability of the blast furnace. The optimal set point or points may also be sent or a control operator, or a computer dashboard for signaling or notification.

Figure 4:
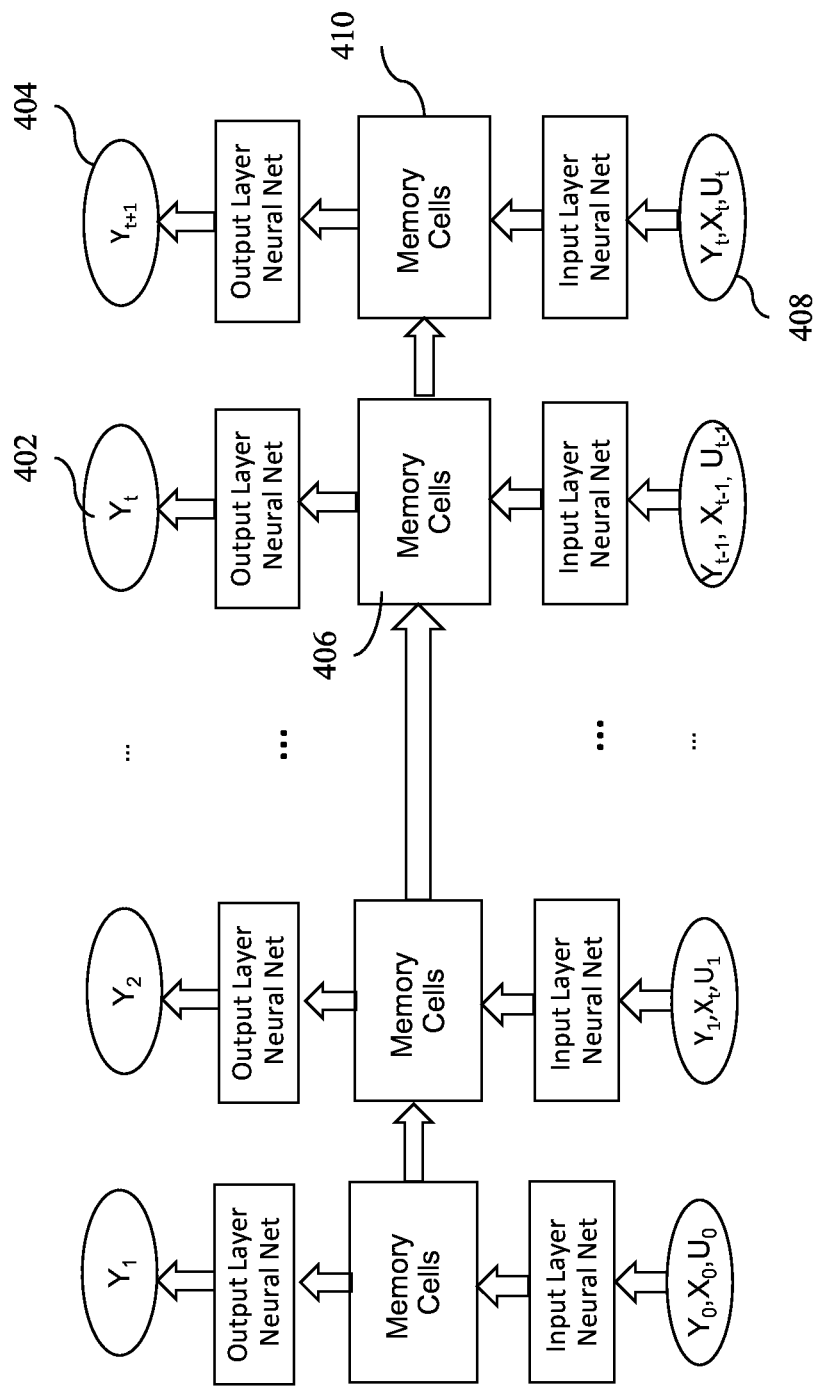
FIG. 4 is a diagram illustrating a neural network predictive model architecture in one embodiment.

FIG. 4 is a diagram illustrating a neural network predictive model architecture in one embodiment. The neural network architecture shown is a long short-term memory (LSTM), a recurrent neural network (RNN), and may be modeled for the predictive model shown in Equation (1). Here, $Y_t$, e.g., 402, denotes a vector of the standard deviations of the target variables, such as the temperature or the pressure, at time t, i.e., $Y_t = (\sigma_{t,1}, \sigma_{t,2}, \ldots, \sigma_{t,S})$ in Equation (2). $X_t$ and $U_t$ are the state variables and the control variables at time t, as defined in Equation (1). At each time step t, LSTM updates its memory cell, e.g., 406, and makes a prediction of the circumferential variability, e.g., the standard deviations of the circumferential sections, at the next time step, $Y_{t+1}$, e.g., 404, from the current observations of the circumferential variability, $Y_t$, state variables, $X_t$, and the control actions, $U_t$, e.g., 408. Because the past information is stored in the memory cells, the previous observations, e.g., $Y_{t-1}$, $Y_{t-2}$, $X_{t-1}$, $X_{t-2}$, $U_{t-1}$, $U_{t-2}$, are not used in the prediction at time t.

Figure 5:
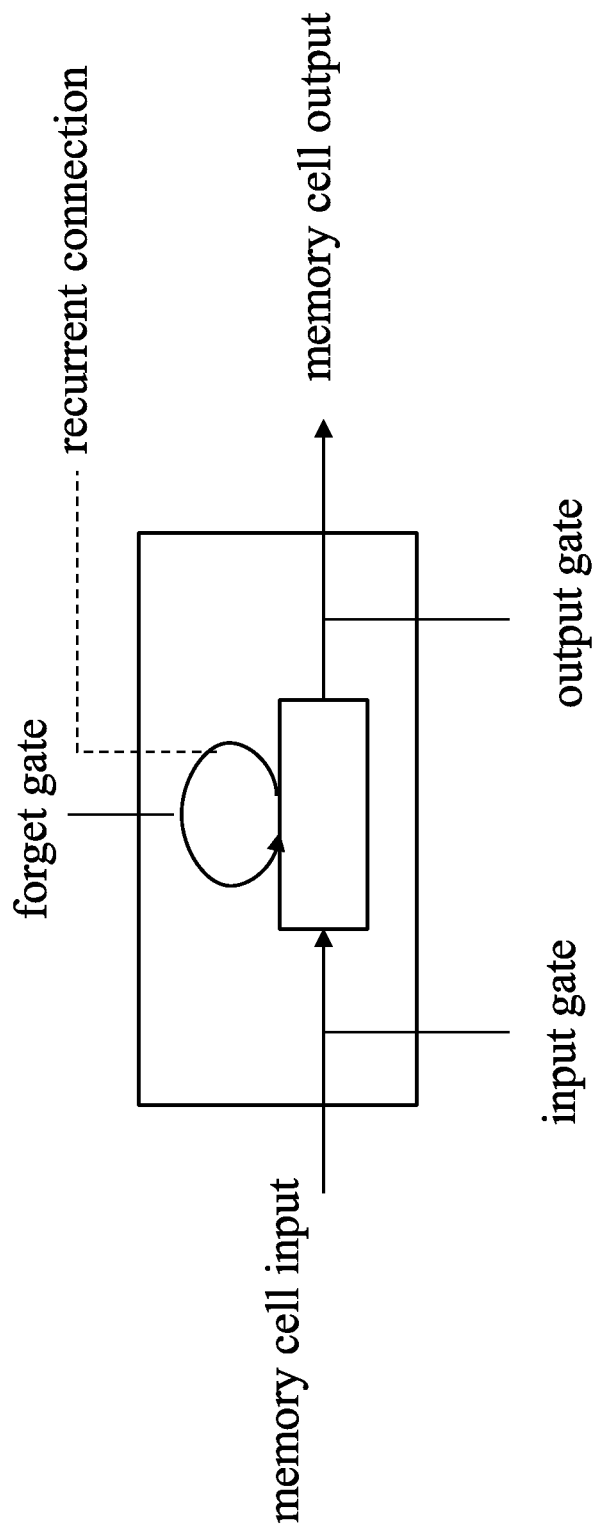
FIG. 5 is a diagram illustrating a memory cell of an LSTM model in one embodiment.

FIG. 5 is a diagram illustrating a memory cell of an LSTM model in one embodiment, for example, memory cells shown as 406, 410 in FIG. 4. Since an LSTM uses data from previous time steps, the amount of data used by a LSTM model may be very large. In order to handle the data size problem in a computer system, the memory cells screen the amount of data to be used by controlling three types of gates. An input gate conditionally determines which input data to use in the LSTM model. A forget gate conditionally determines which information (data) it learned from past time periods is going to be used in the memory cell of current time step. An output gate conditionally determines which data it is currently using in the memory cell, to output to the memory cell of next time period.

Figure 6:
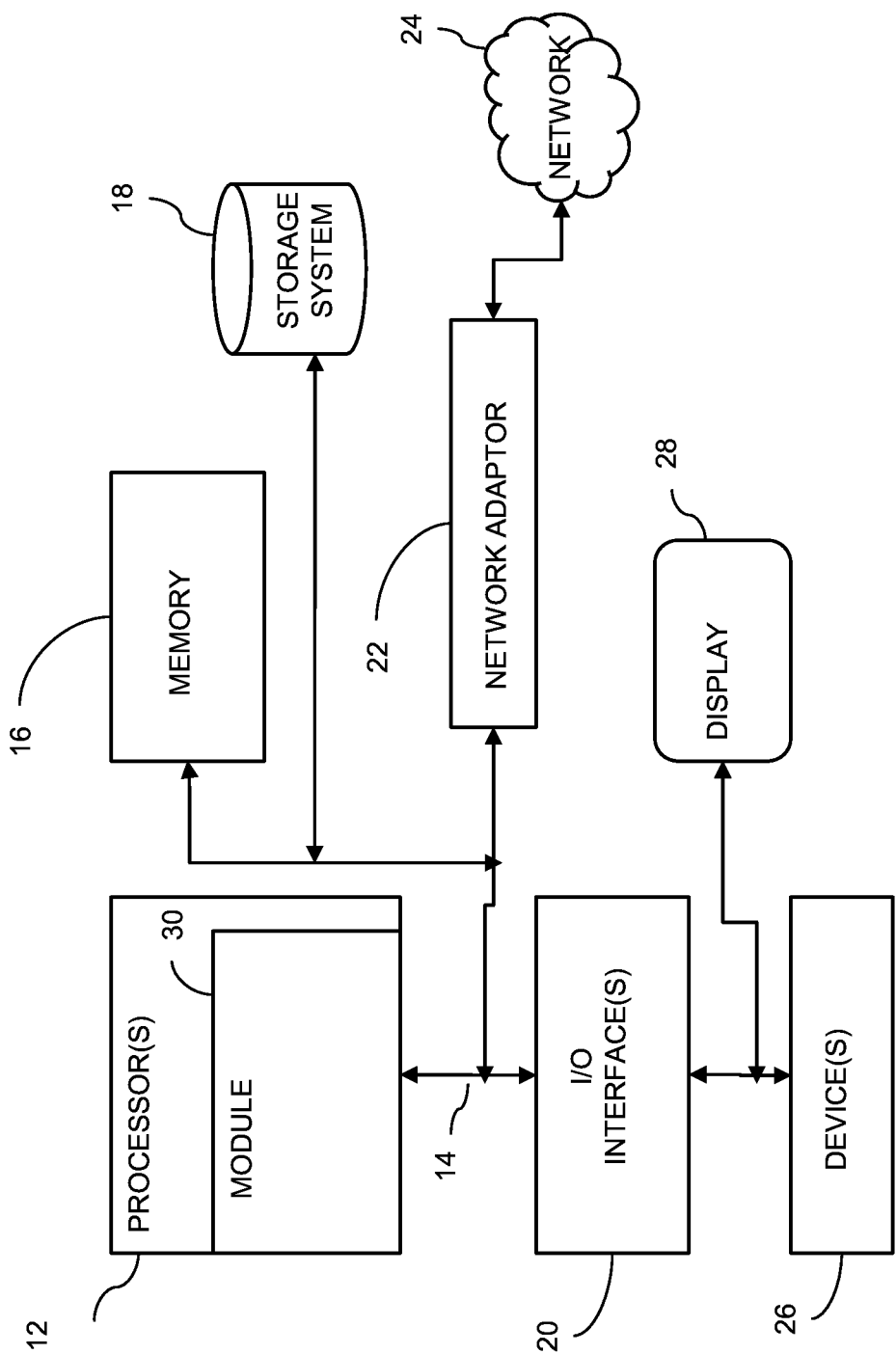
FIG. 6 illustrates a schematic of an example computer or processing system that may implement a system in one embodiment of the present disclosure.

FIG. 6 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer program product for controlling circumferential variability in a blast furnace, the computer program product comprising a computer readable storage medium having program instructions embodied therewith, the program instructions readable by a device to cause the device to:
   generate a predictive model that sets up a relationship between a standard deviation of a selected state variable, state variables and at least one control variable in blast furnace operation for predicting a future circumferential variability index associated with the selected state variable;
   define a number of circumferential sections of the blast furnace;
   receive process data associated with the blast furnace operation;
   train the predictive model associated with the selected state variable for each of the circumferential sections based on the process data, wherein a plurality of trained predictive models is generated associated with different circumferential sections and different selected state variables, the different selected state variables comprising temperature and pressure, wherein running the plurality of trained predictive models outputs a plurality of future circumferential variability indices, each of the future circumferential variability indices corresponding to a respective circumferential section and selected state variable;
   determine at least one future control variable set point that minimizes a sum of the future circumferential variability indices by solving an optimization problem; and
   transmit the at least one future control variable set point to a control system to control the blast furnace operation.

2. The computer program product of claim 1, wherein the blast furnace operation is a continuous operation.

3. The computer program product of claim 1, wherein the device caused to determine at least one future control variable set point that minimizes a sum of the future circumferential variability indices, comprises the device caused to determine at least one future control variable set point that minimizes a weighted sum of the future circumferential variability indices.

4. The computer program product of claim 1, wherein the at least one future control variable set point comprises control variable set points associated with a plurality of future time points.

5. The computer program product of claim 1, wherein the optimization problem includes a regularization term that controls value fluctuations of future control variable set points between future time points.

6. The computer program product claim 1, wherein the at least one control variable includes at least one of a dumping rate of input material, a flow rate of blast air, moisture content of blast air, an oxygen enrichment amount of blast air, and a flow rate of pulverized coal.

7. The computer program product of claim 1, wherein the predictive model's relationship between a standard deviation of a selected state variable, state variables and at least one control variable in blast furnace operation defines a future standard deviation value of the selected state variable as a function of past standard deviations of the selected state variable, past values of the state variables, past values of the at least one control variable and future values of the at least one control variable.

8. The computer program product of claim 1, wherein the predictive model comprises a deep learning model comprising long short-term memory.

9. A system of controlling circumferential variability in a blast furnace, comprising:
   at least one hardware processor operable to generate a predictive model that sets up a relationship between a standard deviation of a selected state variable, state variables and at least one control variable in blast furnace operation for predicting a future circumferential variability index associated with the selected state variable, the at least one hardware processor further operable to define a number of circumferential sections of the blast furnace;
   a storage device storing process data associated with the blast furnace operation and coupled to the at least one hardware processor;
   the at least one hardware processor further operable to receive the process data associated with the blast furnace operation, train the predictive model associated with the selected state variable for each of the circumferential sections based on the process data, wherein a plurality of trained predictive models is generated associated with different circumferential sections and different selected state variables, the different selected state variables comprising temperature and pressure, wherein running the plurality of trained predictive models outputs a plurality of future circumferential variability indices, each of the future circumferential variability indices corresponding to a respective circumferential section and selected state variable, the at least one hardware processor further operable to determine at least one future control variable set point that minimizes a sum of the future circumferential variability indices by solving an optimization problem;
   the at least one hardware processor coupled to a control system, and operable to transmit the at least one future control variable set point to control the blast furnace operation.

10. The system of claim 9, wherein the at least one hardware processor determines at least one future control variable set point that minimizes a sum of the future circumferential variability indices by determining at least one future control variable set point that minimizes a weighted sum of the future circumferential variability indices, wherein a weight is associated with a section of the circumferential sections.

11. The system of claim 9, wherein the at least one future control variable set point comprises control variable set points associated with a plurality of future time points.

12. The system of claim 9, wherein the optimization problem includes a regularization term that controls value fluctuations of future control variable set points between future time points.

13. The system of claim 9, wherein the at least one control variable includes at least one of a dumping rate of input material, a flow rate of blast air, moisture content of blast air, an oxygen enrichment amount of blast air, and a flow rate of pulverized coal.

14. The system of claim 9, wherein the predictive model's relationship between a standard deviation of a selected state variable, state variables and at least one control variable in blast furnace operation defines a future standard deviation value of the selected state variable as a function of past standard deviations of the selected state variable, past values of the state variables, past values of the at least one control variable and future values of the at least one control variable.

15. The system of claim 9, wherein the predictive model comprises a deep learning model comprising long short-term memory.

\* \* \* \* \*